(12) United States Patent
Budden et al.

(10) Patent No.: US 6,354,620 B1
(45) Date of Patent: Mar. 12, 2002

(54) SILICONE COATED TEXTILE FABRICS

(75) Inventors: Graham D. Budden, Penllyn (GB); Diane Marie Kosal; Patricia Ann Rolley, both of Midland, MI (US)

(73) Assignees: Dow Corning Corporation, Midland, MI (US); Dow Corning Ltd., Barry (GB)

( * ) Notice: Subject to any disclaimer, the term of this patent is extended or adjusted under 35 U.S.C. 154(b) by 0 days.

(21) Appl. No.: 09/634,469

(22) Filed: Aug. 9, 2000

(30) Foreign Application Priority Data

Aug. 13, 1999 (GB) ............................................. 9919083

(51) Int. Cl.⁷ .............................................. B60R 21/16
(52) U.S. Cl. .................. 280/728.1; 442/99; 442/136; 427/387; 428/447; 524/493; 106/287.13; 106/287.14; 106/287.16; 528/15; 528/31; 528/32; 525/478
(58) Field of Search .................... 442/99, 136; 427/387; 428/447; 524/401, 445, 449, 493; 525/478; 528/15, 31, 32; 106/287.13, 287.14, 287.16; 280/728.1

(56) References Cited

U.S. PATENT DOCUMENTS

| 4,472,470 A | | 9/1984 | Modie ........................ 428/145 |
| 4,753,978 A | * | 6/1988 | Jensen |
| 5,432,006 A | * | 7/1995 | Kessel et al. |
| 5,520,978 A | * | 5/1996 | Boardman et al. |
| 5,700,870 A | * | 12/1997 | Mueller et al. |
| 5,968,660 A | * | 10/1999 | Armstrong et al. |
| 6,200,915 B1 | * | 3/2001 | Adams et al. |

FOREIGN PATENT DOCUMENTS

| DE | 0 150 385 | 8/1985 |
| DE | 0 591 955 | 4/1994 |
| GB | 0 866 164 | 9/1998 |

\* cited by examiner

*Primary Examiner*—Robert Dawson
*Assistant Examiner*—Marc S. Zimmer
(74) *Attorney, Agent, or Firm*—Jennifer S. Warren; James L. De Cesare

(57) ABSTRACT

A curable silicone-based coating composition, curable to a flexible coating at a coat weight of up to 15 g/m² when cured, comprises an organopolysiloxane polymer having at least two silicon-bonded olefinically unsaturated hydrocarbon substituents, alkoxy groups or hydroxyl groups and having a degree of polymerization of no more than 150, a cross-linking organosilicon material having at least 3 silicon-bonded reactive groups and a catalyst. The coating composition optionally contains non-reinforcing filler but contains no more than 3% by weight of reinforcing filler. The coating is preferably used on a textile fabric that has an elastomeric coating on it, and reduces friction. It is particularly useful for airbags.

13 Claims, No Drawings

SILICONE COATED TEXTILE FABRICS

This invention is concerned with textile fabrics coated with silicone-based coating compositions. More particularly the invention is concerned with textile fabrics that are coated directly or indirectly with silicone-based coating compositions capable of maintaining a pressure barrier between two areas with a pressure differential. The invention also relates to a process of preparing such textile fabrics and to textile articles, e.g. airbags made with coated textile fabrics.

EP 553840 describes a liquid silicone rubber coating composition for application to airbags in automobiles, which comprises a certain polydiorganosiloxane having alkenyl groups, an polyorganosiloxane resin, an inorganic filler, a certain polyorganohydrosiloxane, a platinum group metal catalyst and an epoxy group-containing organosilicon compound. EP 646672 describes a fabric impregnated with a silicone composition comprising a certain linear polyorganosiloxane having aliphatic unsaturation, a certain polyorganohydrosiloxane, a catalyst promoting addition reaction, a hydrophobic silica, a flame retardant and optionally an adhesion-promoting agent, and suggests the use of the fabrics in the construction of airbags.

The benefit of using silicone-coated compositions over other, e.g. organic coating compositions, lies e.g. in the improved weatherability, ability to maintain flexibility and heat resistance of the silicone-based composition.

It is often desirable to provide coated textile fabrics with a finish that is relatively smooth. It is particularly desirable that textile fabrics that are intended for use in applications where they are subject to undesired friction have a low friction surface, i.e. a surface with a relatively low coefficient of friction. A particular example relates to the use of coated textile fabrics in the manufacture of airbags. When airbags are deployed, due to the use of an explosive charge friction is inevitable. Such friction takes place where textile rubs over textile, and also where textile comes into contact with the interior of the automobile or a driver or passenger in an automobile during or after deployment. The amount of friction created can in some circumstances slow down the deployment of the airbag or cause burns to the skin of the driver or passenger.

EP 712956 describes a coating composition for a rubber-coated fabric, comprising a rubber coating composition which comprises a rubber component and a specific solvent and added thereto a powder of an inorganic compound or an organic compound having an average particle size of from 0.5 to 20 $\mu$m, preferably at 20 to 50 parts by weight per 100 parts of the rubber component. The coating composition is said to improve the feeling of a rubber-coated film by eliminating the sticky feeling of the rubber-coated film itself. Examples of the inorganic or organic powders are aluminium hydroxide, mica, polymethyl-silsesquioxane, carbon, polyamide and polyfluoroethylene. Preferred powders are spherical, as a flaky powder is said to be liable to weaken the rubber properties. Particles with an average size over 20 $\mu$m are stated as giving a poor coating property. The presence of a solvent is indicated to be very important, as it has a function of uniformly spreading the powder. Solvents are however, preferably avoided in the coating industry in general.

EP 150385 describes a method of imparting improved tear strength and flame retardancy to a base fabric material comprising applying to at least one side of said base fabric a base silicone coating composition containing an amount of non-abrasive filler effective for imparting said properties. The main application in mind is one of architectural fabric where translucency or transparency of the coating is important. Exemplified coating compositions use about 40 parts of the non-abrasive filler (preferably being calcium carbonate or hydrated alumina), per 100 parts of a siloxane polymer. Excessive viscosities, e.g. obtained if fumed silica or another reinforcing non-abrasive filler is incorporated, are handled by dilution with solvents.

EP 953675 describes a textile fabric coated with an elastomer-forming silicone-based composition, comprising (A) an organopolysiloxane polymer having a siloxane backbone being end-blocked with at least two silicon-bonded groups R, wherein R denotes an olefinically unsaturated hydrocarbon substituent, an alkoxy group or a hydroxyl group, (B) a cross-linking organosilicon material having at least 3 silicon-bonded reactive groups, (C) a catalyst capable of promoting the reaction between the silicon-bonded groups R of compound (A) and the silicon-bonded reactive group of compound B, (D) a first filler which is a reinforcing filler for the silicone-based composition and (E) at least 2 parts by weight for every part of the first filler, of a second filler, which has a substantially laminar form. The use of a laminar second filler tends to reduce the physical properties of the cured elastomeric coating.

We have now surprisingly found that if a certain silicone-based composition is coated on top of another coating, the good physical properties of the underlying coating are not impaired and the coefficient of friction can be reduced.

A curable silicone-based coating composition according to the invention, curable to a flexible coating at a coat weight of up to 15 g/m$^2$ when cured, comprises A. an organopolysiloxane polymer having a siloxane backbone of degree of polymerisation no more than 150 end-blocked with at least two silicon-bonded groups R, wherein R denotes an olefinically unsaturated hydrocarbon substituent, an alkoxy group or a hydroxyl group, B. a cross-linking organosilicon material having at least 3 silicon-bonded reactive groups, C. a catalyst capable of promoting the reaction between the silicon-bonded groups R of compound A and the silicon-bonded reactive group of compound B, D. optionally a non-reinforcing filler and E. optionally up to a maximum of 3% by weight of reinforcing filler.

The curable silicone-based coating composition can be coated onto a substrate and cured in situ. Because the coating composition is curable to a flexible coating at a thickness up to 15 g/m$^2$, it is suitable for textile fabrics. Flexibility means that the coated fabric can be folded easily, as is for example required by an airbag which needs to be stored in a small compartment in a vehicle, e.g. inside the steering wheel or the roof void of a car. This is very surprising in view of the short chain length of polymers (A), which in most circumstances tend to form very brittle coatings upon curing, and are therefore unsuitable for applications where flexibility is crucial.

Useful organopolysiloxane polymers (A) for use in the curable silicone-based compositions according to the invention have units of the general formula $R^1_a R^2_b SiO_{4-a-b/2}$ (I), wherein $R^1$ is a monovalent hydrocarbon group having up to 18 carbon atoms, $R^2$ is a monovalent hydrocarbon or hydrocarbonoxy group or a hydroxyl group, a and b have a value of from 0 to 3, the sum of a+b being no more than 3. Preferably the organopolysiloxane polymers have a generally linear nature having the general structure II

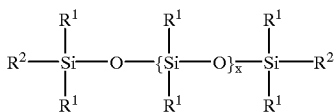

(II)

wherein $R^1$ and $R^2$ have the same meaning as above, and wherein x is an integer of no more than 148, preferably having a value of from 5 to 100, more preferably 8 to 50. It is particularly preferred that $R^1$ denotes an alkyl or aryl group having from 1 to 8 carbon atoms, e.g. methyl, ethyl, propyl, isobutyl, hexyl, phenyl or octyl. More preferably at least 50% of all $R^1$ groups are methyl groups, most preferably substantially all $R^1$ groups are methyl groups. $R^2$ is preferably selected from a hydroxyl group, an alkoxy group or an aliphatically unsaturated hydrocarbon group. More preferably $R^2$ denotes either a hydroxyl group or alkoxy group having up to 3 carbon atoms suitable for condensation reactions, or an alkenyl or alkynyl group having up to 6 carbon atoms, more preferably vinyl, allyl or hexenyl, suitable for addition reactions.

Preferably the organopolysiloxane polymers (A) have at least two silicon-bonded alkenyl groups per molecule. Such polymers are well known in the art. Preferred materials have a viscosity of not greater than 500 mPa·s at 25° C., more preferably a viscosity of from 4 to 100 mPa·s. at 25° C., although these can be mixed with organopolysiloxanes (A) of higher viscosity, especially if the more viscous organopolysiloxanes have high functionality. Although these alkenyl-substituted polymers (A) are preferably as described above under structure (II), they may be homopolymers, copolymers or mixtures thereof which comprise units of the general formula $R^1{}_aR^3{}_cSiO_{4-a-b}/2$ wherein $R^1$ and a are as described above, $R^3$ is an alkenyl group having up to 8 carbon atoms and c is 0 or 1 provided that a+c is not greater than 3.

The organopolysiloxane (A) can for example comprise at least one polymer containing vinylmethylsiloxane units, which can for example comprise from 0.5% or 1% by weight of the diorganosiloxane units of (A) up to 50 or even 100%. Mixtures of such vinylmethylsiloxane polymers can be used; for example either a polydiorganosiloxane (A) in which 10 to 50 mole % of the siloxane units are vinylmethylsiloxane units or a polydiorganosiloxane (A) in which 1 to 10 mole % of the siloxane units are vinylmethylsiloxane units or a mixture of both can be used as polydiorganosiloxane (A). The polydiorganosiloxane (A) preferably contains vinyldimethylsiloxy terminal groups, although a vinylmethylsiloxane polymer can contain other terminal groups such as trimethylsilyl.

Alternatively organopolysiloxane (A) can be a polydiorganosiloxane having the general formula (III),

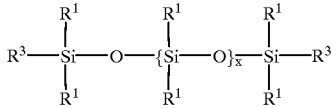

(III)

where $R^1$ is as defined above, $R^3$ denotes an alkenyl group having up to 8 carbon atoms, with the formula $-R^4{}_y-CH=CH_2$, where $R^4$ denotes a divalent hydrocarbon group having up to 6 carbon atoms, preferably an alkylene group having up to 4 carbon atoms, y has a value of 0 or 1, and x has a value of from 5 to 100, preferably 8 to 50, most preferably 8 to 20. Such an α,ω-vinyldimethylsiloxy polydimethylsiloxane polymer preferably has a viscosity of from 4 to 100 mPa·s at 25° C., more preferably 4 to 50 mPa·s, and can be used as the only organopolysiloxane (A) or as a mixture with a vinylmethylsiloxane polymer.

The organopolysiloxane (A) can advantageously comprise a polysiloxane containing both silicon-bonded vinyl groups and silicon-bonded hydroxyl groups, for example a hydroxy-terminated poly(dimethyl, vinylmethyl siloxane).

The cross-linking organosilicon material (B) is an organosilicon compound, which is capable of reacting with component (A) above. Suitable organosilicon compounds may vary from viscous materials to freely flowing liquids. Preferred materials have a viscosity of not greater than 100 mPa·s at 25° C., more preferably 2 to 55 mPa·s at 25° C. They may be monomers, homopolymers, copolymers or mixtures thereof which comprise at least one unit of the general formula $R^1{}_aR^5{}_bSiO_{4-a-b}/2$ wherein $R^1$, a and b are as defined above and $R^5$ is a hydrogen atom, a hydroxyl or an alkoxy group, except that where the organosilicon compound is a monomer (a silane) a+b would be 4 and b would be at least 3.

Cross-linking organosilicon materials (B) are preferably selected from silanes, low molecular weight organosilicon resins and short chain organosiloxane polymers. The cross-linking material (B) has at least 3 silicon-bonded substituents $R^5$ that are capable of reacting with the silicon-bonded group $R^2$ of the organopolysiloxane polymer (A) described above. Where the group $R^2$ is a hydroxyl or alkoxy group, it is preferred that the reactive substituents on the cross-linking organosilicon compound are either alkoxy groups or hydroxyl groups, allowing the condensation to take place between the two components according to the general reaction scheme (IV) or (V), wherein R* denotes an alkyl group $$\equiv Si-OH + HO-Si \equiv \rightarrow \equiv Si-O-Si \equiv + H_2O \quad (IV)$$

$$\equiv Si-OR^* + HO-Si \equiv \rightarrow \equiv Si-O-Si \equiv + R^*-OH \quad (V)$$

Where the group $R^2$ of organopolysiloxane (A) is hydroxyl or an aliphatically unsaturated hydrocarbon group, the reactive substituents $R^5$ on the cross-linking organosilicon material are hydrogen atoms, allowing either condensation or addition reaction between the cross-linking organosilicon material and the organopolysiloxane polymer (A), according to the general reaction scheme (VI) or (VII), wherein $R^4$ is a divalent hydrocarbon group as defined above and y is 0 or 1.

$$\equiv Si-R^4{}_yCH=CH_2 + H-Si \equiv \rightarrow \equiv Si-R^4{}_yCH_2-CH_2-Si \equiv \quad (VI)$$

$$\equiv Si-OH + H-Si \equiv \rightarrow \equiv Si-O-Si \equiv + H_2 \quad (VII)$$

Suitable silanes that may serve as cross-linking organosilicon compounds include alkyltrialkoxy silane, e.g. methyltrimethoxy silane, ethyltrimethoxy silane, methyltriethoxy silane or methyltrihydrosilane. Suitable organosilicon resin compounds include organosilicon resins consisting mainly of tetrafunctional siloxane units of the formula $SiO_{4/2}$ and monofunctional units $R_aR^5{}_bSiO_{1/2}$, wherein R, $R^5$, a and b are as defined above. Suitable short chain organosiloxane polymers include short chain polyorganosiloxanes having at least 3 silicon-bonded alkoxy, hydroxyl or hydrogen atoms per molecule, e.g. trimethyl siloxane end-blocked polymethylhydrosiloxane having up to 20 carbon atoms, tetramethylcyclotetrasiloxane and silanol end-blocked dimethylsiloxane-methylsilanol copolymers.

Organosilicon component (B) is preferably a short chain polyorganosiloxane having at least 3 silicon-bonded hydrogen atoms, preferably having a silicon-bonded hydrogen atom on at least 40% of, more preferably on the majority of silicon atoms in the molecule. Particularly preferred are organosilicon compounds that are substantially linear or cyclic compounds. However, small amounts of trifunctional or tetrafunctional siloxane units may also be present.

Preferred compounds for (B) are organosilicon compounds having the general formulae (VIII) or (IX)

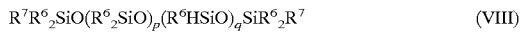  (VIII)

(IX)

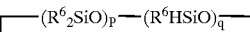

wherein $R^6$ denotes an alkyl or aryl group having up to 10 carbon atoms, $R^7$ is a group $R^6$ or a hydrogen atom, p has a value of from 0 to 20, q has a value of from 1 to 70, and there are at least 3 silicon-bonded hydrogen atoms present per molecule. It is not important if the silicon-bonded hydrogen atoms are on terminal silicon atoms for linear siloxane compounds (VII) or not. It is preferred that $R^6$ denotes a lower alkyl group having no more than 3 carbon atoms, most preferably a methyl group. $R^7$ preferably denotes an $R^6$ group, provided at least 3 of them are hydrogen atoms. Most preferably p and q have similar values or p=0 and q has a value of from 6 to 70, more preferably 20 to 60, or where cyclic organosilicon materials are used, from 3 to 8. The cross-linking component may comprise a mixture of several organosilicon compounds as described.

The catalyst (C) may be any compound which catalyses the reaction between components (A) and (B) above. Where the reaction is a condensation reaction, the catalyst may be any of the known condensation catalysts, e.g. acids, including sulphuric acid, hydrochloric acid, Lewis acids, bases, e.g. sodium hydroxide, potassium hydroxide, tetramethylammonium hydroxide, tetrabutylphosphonium silanolate and amines, catalysts based on tin or titanium, e.g. dialkyltin dicarboxylic acids and tetraalkyl titanates. Particularly useful organotitanium compounds have organic groups attached to titanium through a titanium-oxygen-carbon linkage. The main types are ortho-esters, i.e. alcoholates and acylates in which the organic group is derived from a carboxylic acid. An organotitanium catalyst may also contain both types of the aforementioned groups attached to the same titanium atom. Operative organotitanium catalysts thus include those of the formula $Ti(OR^8)4$ wherein $R^8$ is alkyl, alkoxyalkyl or acyl, for example tetraisopropyl titanate, tetramethoxyethoxytitanate and di-isopropyl diacetoxytitanate. The preferred organotitanium catalysts for use in this invention are the chelated or partially chelated titanium compounds. These materials are produced, for example by reacting an alcoholate as referred to above with an α- or β-diketone or a derivative thereof.

For the more preferred addition reaction systems for use in the present invention, suitable catalysts include Group VIII metal-based or noble metal catalysts e.g. rhodium, ruthenium, palladium, osmium, irridium or platinum containing catalysts. Platinum-based catalysts are particularly preferred and may take any of the known forms, ranging from platinum deposited onto carriers, for example powdered charcoal, to platinic chloride, salts of platinum, chloroplatinic acids and encapsulated forms thereof. A preferred form of platinum catalyst is chloroplatinic acid, platinum acetylacetonate, complexes of platinous halides with unsaturated compounds such as ethylene, propylene, organovinylsiloxanes, and styrene, hexamethyldiplatinum, $PtCl_2$, $PtCl_3$, $PtCl_4$, and Pt $(CN)_3$. The preferred platinum catalyst is a form of chloroplatinic acid, either as the commonly available hexa-hydrate form or in its anhydrous form, as taught in U.S. Pat. No. 2,823,218. Another particularly useful catalyst is the composition that is obtained when chloroplatinic acid is reacted with an aliphatically unsaturated organosilicon compound such as divinyltetramethyldisiloxane, as disclosed in U.S. Pat. No. 3,419,593. Proportions of from 0.1 to 0.5 parts by weight of such complex as catalyst per 100 parts by weight of component (A), having aliphatically unsaturated substituents, are preferred. It is preferred that the platinum-based catalyst (C) is employed in an amount giving from 2 to 100 ppm by weight of platinum metal based on the total weight of the composition, more preferably 5 to 50 ppm.

A filler (D) may also be present in the curable compositions for use in the coating of textile fabrics according to this invention. The filler is substantially non-reinforcing, and includes for example calcium carbonate, aluminium trihydrate, carbon black and diatomaceous earth. Preferably however, the filler is of substantially laminar form. This means that the preferred filler is a material where the dimensions of the particles are such that the average length and width of the particles is significantly larger that their average thickness. This will give the particles a laminar or plate-like shape. The width and length of the particles is preferably at least ten times greater than the thickness of the particles, more preferably 100 times or more. Suitable particles of the laminar fillers have an average diameter of from 1 to 500 μm, and a thickness of 1 to 100 Ångstrom per layer. The actual particles very often consist of a number of layers agglomerated together, which may result in the particles having a seemingly greater thickness. However, these particles should still have a thickness that is sufficiently smaller than the width and length to result in a laminar particle. Several particles can be agglomerated by physical forces into smaller or larger clusters. The dimensional conditions outlined above, however, apply not to these larger agglomerates, but to the particles themselves. Examples of suitable fillers are philosilicates, metal flakes, expanded graphite, laminar quartz, zeolites, clays, micas and laminar graphite. It is particularly preferred that the laminar filler is selected from laminar or layer silicates, especially from pyrophillite, talc, micas, vermiculites and smectites.

Although it is preferred that the laminar filler is hydrophobic in nature, as this improves its compatibility with silicone-based materials, it is not required that the filler is wholly hydrophobic. Indeed some fillers, e.g. talc, are known to have some hydrophobic and some hydrophilic sites. The laminar filler may be treated to make it hydrophobic, where required, for example by the methods described below for reinforcing fillers.

It is particularly preferred that the filler is a laminar "soft" filler, especially of a Mohs value of no more than 5, preferably no more than 2, most preferably from 0.2 to 1. Accordingly the most preferred filler is talc or aluminite, carnotite, graphite, pyrophyllite or thermonatrite.

The curable coating composition may contain from 0 to 1000%, preferably 0 to 500%, more preferably 0 to 200%, most preferably 50 to 150%, of the filler (D) based on the organopolysiloxane (A). It is particularly preferred that the amount of filler (D) is adapted to the degree of polymerisation (DP) of organopolysiloxane (A). Where the DP of (A) is higher than 50, it is preferred that filler (D) is present, and the higher the DP of (A) the more the amount of filler (D) becomes beneficial, provided that the viscosity of the composition as a whole remains low enough for application as a coating. The viscosity of the coating composition is preferably below 10 Pa·s. at 25° C., measured using a Brookfield viscometer with spindle 5 (or using a HAT with spindle 4) at a speed of 50 rpm. Preferably this dynamic viscosity is from 0.8 to 3.5 Pa·s. Preferred compositions according to the invention typically remain at workable viscosities for at least 9 hours when stored at temperatures up to 40° C.

The curable silicone-based coating composition does not contain any more than 3% by weight of a strongly reinforcing filler. Examples of such fillers include silica, titania, ground quartz, alumino silicates, and organosilicon resins. We have found that the presence of amounts above 3% by weight of such fillers increases the coefficient of friction to unacceptable levels. Preferably, no reinforcing filler is present.

If a reinforcing filler is present, it is preferably hydrophobic. Particular reinforcing fillers are silica fillers, e.g. fumed or precipitated silica fillers. The surface of the filler particles is preferably rendered hydrophobic in order to make the filler more compatible with the compositions used in the present invention. Rendering the filler particles hydrophobic may be done either prior to or after dispersing the filler particles in the siloxane component. This can be done by pre-treatment of the filler particles with fatty acids, reactive silanes or reactive siloxanes. Examples of suitable hydrophobing agents include stearic acid, dimethyldichlorosilane, trimethylchlorosilane, hexamethyldisilazane, hydroxyl end-blocked or methyl end-blocked polydimethylsiloxanes, siloxane resins or mixtures of two or more of these. Fillers which have already been treated with such agents are commercially available from a number of sources. Alternatively, the surface of the filler may be rendered hydrophobic in situ, i.e. after the filler has been dispersed in the organopolysiloxane polymer material. This may be effected by adding to the polysiloxane component prior to, during or after the dispersion of the filler, an appropriate amount of a hydrophobing agent of the kind described above, for example a reactive silane or siloxane, and heating the mixture sufficiently to cause reaction, e.g. to a temperature of at least 40° C.

The average particle size of reinforcing fillers may be from 0.1 to 20 µm diameter, preferably from 0.2 to 5 µm, most preferably 0.4 to 2.5 µm. The surface area of such reinforcing fillers is usually no less than 50 m$^2$/g as measured by BET measurement.

Preferred curable silicone based compositions according to the invention comprise sufficient of cross-linking organosilicon material (B) to give a molar ratio of Si-bonded reactive groups in (B) to silicon-bonded groups R in (A) of from 1/2 to 10/1, more preferably from 1.1/1 to 6/1, and sufficient of catalyst (C) to ensure the reaction between the silicon-bonded groups R of compound (A) and the silicon-bonded reactive group of compound (B) can proceed. For the preferred curable compositions based on organosilicon compounds which cure by reaction of alkenyl groups present in component (A) and silicon-bonded hydrogen atoms in component (B), it is particularly preferred that the ratio of silicon-bonded hydrogen atoms to alkenyl groups is from 2/1 to 5/1, most preferably from 2.5/1 to 4.5/1. Such ratios lead to good adhesion of the curable composition to the substrate.

The curable silicone based coating composition for use in a method according to the invention, as is described below, may be provided in one part although it is preferred to package the composition in two or more parts, most preferably two parts, which are mixed prior to use. The cross-linking organosilicon compound, e.g. the organohydrogensiloxane, and the catalyst compound (C), e.g. the noble metal catalyst, are preferably stored separately. For example, at least some of organopolysiloxane compound (A), catalyst (C) and optionally all or part of the fillers (D) and (E) can be stored as one pack and the cross-linking organosilicon material, together with the remainder of Components (A), (D) and (E), can be stored as a second pack. The two parts combine the reactants in a way that permits mixing the two parts in a suitable weight ratio, e.g. 1/1 or 10/1 or 1/10. Another acceptable approach is to have part of component (A) with all of Components (B), (D) and (E) in a first part and the remainder of (A) with catalyst (C) in a second part.

The curable silicone-based composition may contain additional ingredients such as dyes, adhesion promoters, colorants, pigments, bath-life extenders and flexibilizers, cure inhibitors, flame retardants, antioxidants and catalyst boosters. The preferred compositions, based on a curing mechanism via addition reaction, preferably contain an addition catalyst inhibitor, for example an acetylenic alcohol, a dialkyl maleate, and/or a primary alcohol in a proportion sufficient to ensure that the coating composition cures in not less than 10 seconds at 100° C. Examples of adhesion promoting additives are epoxy-substituted alkoxysilanes described, for example, in U.S. Pat. No. 3,455,877 and alkenyl functional silanol terminated organopolysiloxanes described in U.S. Pat. No. 4,082,726, typically present at 0.1% to 3% by weight of the total weight of the curable coating composition. Other suitable additives are those that e.g. enhance the efficiency of an adhesion-promoting additive, e.g. a metal chelate compound such as acetyl acetonates e.g. triacetyl-acetonates of aluminium, tetra acetylacetonates of zirconium and triacetylacetonates of iron. Aluminium chelates are preferred, especially aluminium acetyl-acetonate. Typical amounts of chelates used are 0.01 to about 5 parts by weight, preferably about 0.1 to 0.3 parts by weight per 100 parts of the composition.

The invention includes a method of coating a textile fabric with an elastomer-forming composition, characterised in that a curable coating composition as defined above is applied to the elastomer-coated fabric at a thickness of 1 to 25 g/m2 and is cured to a flexible coating.

The composition may be applied according to known techniques to the textile fabric substrates. These include spraying, gravure coating, bar coating, coating by knife-over-roller, coating by knife-over-air, padding and screen-printing. It is preferred that the composition is applied by gravure coating or bar coating. Preferably the coating is applied at a level that will result after curing in a coat weight of no more than 25 g/m$^2$, preferably 5 to 10 or 15 g/m$^2$, more preferably from 2 to 6 g/m$^2$. If the curable coating of the invention is applied to give a coat weight over 15 g/m$^2$, the coating should be flexible at the level applied.

The fabrics which are coated are preferably made from synthetic fibres or blends of natural and synthetic fibres, such as polyester, polyimides, polyethylene, polypropylene, polyester-cotton, glass fibre, most preferably polyester or nylon (such as nylon 6,6) woven fabric.

The textile fabric is already coated with an elastomer-forming composition, which may or may not be readily cured prior to application of the curable coating composition of this invention. It is preferred that such elastomer-forming composition is a silicone-based elastomer, although organic based elastomers such as polyurethane or polyvinyl chloride, are usable alternatives. It is also preferred that the elastomer forming composition has already been cured, thus forming an elastomeric coating onto the fabric prior to the application of the curable coating compositions of this invention.

It is possible to apply onto a fabric coated with the composition of the invention an additional textile fabric, which can be woven or non-woven, to improve the strength and/or the feel of the fabric, although one of the advantages of the present invention is that no such additional fabric is needed.

Curing conditions for curable silicon-based coating compositions according to the invention will depend on the exact nature of the composition used, but are preferably 120 to 200° C for a period of up to 5 minutes.

A coated fabric according to the invention comprises a fabric having an elastomeric coating and in addition a coating which is obtained by applying and allowing to cure a curable silicone-based coating composition according to the invention.

The coated fabrics of this invention may be used to make any articles. They are particularly suited for use in the manufacture of inflatable safety restraint devices, e.g. airbags, inflatable safety curtains, balloons, chutes. The coated fabrics may alternatively be used for the manufacture of architectural fabric structures and geotextiles.

Coated fabrics according to the invention exhibit good physical properties. They tend to have an improved non-tacky finish, which is dry and smooth to the touch, giving a lower friction coefficient. They generally give better properties at lower coat weights than equivalent prior art fabrics, e.g. with regard to adhesion and non-friction. Coated fabrics may also provide improved soil release. A particularly surprising effect of the invention is that the cured coating is sufficiently flexible, while having good physical properties, to be able to improve the performance of coated fabrics in applications such as airbags.

There now follows a description of examples, which serve to illustrate the invention. Parts and percentages are given in weight, unless otherwise stated and viscosity is dynamic viscosity at 25° C.

EXAMPLES

A first curable coating composition was prepared by mixing 59 parts of a vinyl end-blocked polydimethyl siloxane (A), sufficient of an organosilicon cross-linker having silicon-bonded hydrogen atoms, to give a number ratio of silicon-bonded hydrogen atoms to vinyl groups in the composition of 3:1, 40 parts of talc, 0.1 parts of a inhibitor and 0.7 parts of a platinum based catalyst. In a first example composition (CCC1), the vinyl end-blocked polydimethyl siloxane (A) was 9 siloxane units long and had 7.7% vinyl per molecule. In a second example composition (CCC2), the siloxane (A) was 50 siloxane units long and had 1.44% vinyl. In a third example composition (CCC3), the siloxane length was 110 units long, with 0.64% vinyl, and in the fourth example composition (CCC4), the polymer was 150 units long, and had a vinyl content of 0.50%.

A second curable coating composition was prepared in the same way as the first composition, with the difference that instead of 40 parts of talc, in a fifth example composition (CCC5), 40 parts of talc and 1.8 parts of silica were used, in a sixth example composition (CCC6), 10 parts of silica were used, in a seventh example composition (CCC7), 77 parts of calcium carbonate were used, and in an eighth example composition (CCC8) aluminium trihydrate was used.

A third curable coating composition was prepared by mixing 38.5 parts of a vinyl end-blocked polydimethyl siloxane (A) of CCC1, 20.5 parts of an trimethyl end-blocked polymethyl hydrosiloxane cross-linker having a degree of polymerisation of about 60, talc, 0.1 parts of a inhibitor and 0.7 parts of a platinum based catalyst. In a ninth example composition (CCC9), 6.6 parts of the talc were used. In a tenth example composition (CCC10), 15 parts of the talc were used. In an eleventh example composition (CCC11), 25.6 parts of the talc were used.

A fourth curable coating composition was prepared by mixing 53.6 parts of a vinyl end-blocked polydimethyl siloxane (A) of CCC2, 5.4 parts of an trimethyl end-blocked polymethyl hydrosiloxane cross-linker having a degree of polymerisation of about 60, talc, 0.1 parts of a inhibitor and 0.7 parts of a platinum based catalyst. In a twelfth example composition (CCC12), 6.6 parts of the talc were used. In a thirteenth example composition (CCC13), 15 parts of the talc were used. In a fourteenth example composition (CCC14), 25.6 parts of the talc were used.

A fifth curable coating composition was prepared by mixing 56.5 parts of a vinyl end-blocked polydimethyl siloxane (A) of CCC3, 2.5 parts of an trimethyl end-blocked polymethyl hydrosiloxane cross-linker having a degree of polymerisation of about 60, talc, 0.1 parts of a inhibitor and 0.7 parts of a platinum based catalyst. In a fifteenth example composition (CCC15), 6.6 parts of the talc were used. In a sixteenth example composition (CCC16), 15 parts of the talc were used.

In a seventeenth example composition (CCC17), 25.6 parts of the talc were used.

A sixth curable coating composition was prepared by mixing 57 parts of a vinyl end-blocked polydimethyl siloxane (A) of CCC4, 2.0 parts of an trimethyl end-blocked polymethyl hydrosiloxane cross-linker having a degree of polymerisation of about 60, talc, 0.1 parts of a inhibitor and 0.7 parts of a platinum based catalyst. In an eighteenth example composition (CCC18), 6.6 parts of the talc were used. In a nineteenth example composition (CCC19), 15 parts of the talc were used. In a twentieth example composition (CCC20), 25.6 parts of the talc were used.

Each of the example compositions were coated on top of a nylon fabric which had first been coated with an elastomer-forming composition which had been prepared by mixing 5 parts of a first composition comprising 64 parts of a 70/30 mixture of a dimethylvinylsiloxy-terminated polydimethylsiloxane and hydrophobic silica, 26 parts of ground quartz, 4 parts of calcium carbonate and a catalytic amount of a platinum based catalyst and 1 part of a second composition comprising 50 parts of a 70/30 mixture of a dimethylvinylsiloxy-terminated polydimethylsiloxane and hydrophobic silica, 46 parts of a dimethylsiloxane methylhydrogen siloxane copolymer having silicon-bonded hydrogen atoms on about 50% of the silicon atoms.

A double layered polyamide fabric of 470 Dtex, made into airbag-type envelopes of A4 size was coated at a coat weight of 120 g/m². The elastomer-forming composition was allowed to cure at elevated temperatures for 4 minutes, followed by applying to the surface thereof a thin layer of each of the example compositions, to a thickness of 0.6 g/m². The composition was then cured at 140° C. for an additional 4 minutes, prior to allowing it to cool down in preparation for testing.

A comparative (Comp) set of tests was done using the nylon fabric that was coated with the elastomer-forming composition, but not with any of the example compositions.

Friction (dynamic) measurements (in $\mu$) were made on all coated fabrics according to DIN 53 375, and results are given in Table I. The materials were tested when dragged over a glass surface, a chamois leather surface and over a layer of coated fabric identical to itself. Friction coefficient values are given in each case. It was found that the direction of dragging the sled had no substantial effect on the coefficients of friction. As can be seen from the examples below, all fabrics that were coated with the elastomer-forming composition and the example composition gave lower acceptable coefficients of friction, compared to the comparative examples. (N/A means that the values were outside the sensitivity of the test equipment).

TABLE I

| Example Composition | μ against glass | μ against chamois | μ against itself |
|---|---|---|---|
| CCC1 | 0.47 | 0.77 | 0.33 |
| CCC2 | 0.47 | 0.71 | 0.36 |
| CCC3 | 0.49 | 0.77 | 0.38 |
| CCC4 | 0.59 | 0.94 | 0.40 |
| CCC5 | 0.76 | 0.72 | 0.46 |
| CCC6 | 0.58 | 0.8 | 0.68 |
| CCC7 | 0.54 | 0.78 | 0.52 |
| CCC8 | 0.46 | 0.66 | 0.62 |
| CCC9 | 1.4 | 0.5 | 0.5 |
| CCC10 | 1.3 | 0.5 | 0.4 |
| CCC11 | 0.8 | 0.9 | 0.6 |
| CCC12 | N/A | 1.9 | N/A |
| CCC13 | 1.6 | 0.7 | A.6 |
| CCC14 | 1.4 | 0.6 | 0.5 |
| CCC15 | N/A | N/A | N/A |
| CCC16 | N/A | 1.8 | N/A |
| CCC17 | 1.8 | 1.2 | 0.9 |
| CCC18 | N/A | N/A | N/A |
| CCC19 | N/A | 2.0 | N/A |
| CCC20 | 2.1 | 1.7 | 1.3 |
| Comp | N/A | N/A | 1.16 |

Examples 21 to 23

26.7 g of a hydroxy-terminated dimethyl, methylvinyl polysiloxane of viscosity 20 mPa·s was mixed with 10.6 g of a dimethylvinylsiloxy-terminated dimethyl vinylmethyl polysiloxane of viscosity 15 Pa·s having a methylvinylsiloxane content of about 25% and 11.9 g of a dimethylvinylsiloxy-terminated dimethyl methylvinyl polysiloxane of viscosity 350 mPa·s having a methylvinylsiloxane content of about 2% to form a mixture comprising polysiloxane (A) and with 49.4 g talc non-reinforcing filler and 1.5 g of a platinum-containing catalyst of Pt content 0.5%.

The resulting base composition was mixed with varying amounts of a trimethylsiloxy-terminated polymethylhydrogensiloxane of degree of polymerisation about 60 units and 1.8 g of a mixture of 3.5% acetylenic alcohol inhibitor in polysiloxane diluent as shown in Table 2 below. The viscosity of the resulting coating composition was measured immediately after mixing and after 4 hours storage at 25° C.

The coating composition was applied as a topcoat at a coat weight of 15 g/m2 to a polyamide airbag fabric, which had been coated with 120 g/m2 of a silicone elastomer, and the topcoat was cured at 150 for 3 minutes. The robustness of the resulting coated fabric was tested by a scrubs test (please give details) both before and after ageing at 125° C. for 2 weeks. The coefficient of friction of the coated fabric against itself was also measured before and after ageing.

The scrub test is based on ISO 598. Coated fabric samples were given repeated flexes under a specified force and the surface was examined periodically for any signs of delamination. In the test a specimen 100 mm×50 mm was cut with the longer side parallel to the warp threads. The specimen was place in a scrub tester conforming to ISO 598, having a 12 mm foot and an 11 mm base bar, such that the coated side of the sample was folded over on itself. An abrading foot was put in contact with the sample and the clamps moved the sample back and forth along the lengthwise direction of the fabric, with each movement being counted as a scrub. The results are shown in Table 2.

TABLE 2

|  | Ex. 21 | Ex. 22 | Ex. 23 |
|---|---|---|---|
| Crosslinker | 40.7 g | 33.5 g | 53.2 g |
| SiH/vinyl | 4.11 | 3.38 | 5.34 |
| Viscosity | 2.64 Pa·s | 3.28 Pa·s | 1.68 Pa·s |
| Scrubs | 3000 | 2500 | 2500 |
| Scrubs (aged) | 1500 | 2000 | 1500 |
| Friction coeff. | 0.286 | 0.263 | 0.155 |
| Friction coeff. (aged) | 0.242 | 0.241 | 0.120 |

The results quoted in Table 2 show that the coatings of Examples 21 to 23 had low coefficient of friction but were sufficiently flexible to give a robust coating even after ageing.

The dirt pick-up of the coated fabric was tested in a comparative example. An elastomer-coated fabric was part coated according to Example 21 and cured. The coated fabric was sprinkled with dirt, shaken off and aged for 2 weeks. No dirt remained on the fabric coated according to the invention but the section where the elastomer had not been overcoated held on to the dirt even after spraying with water.

What is claimed is:

1. A curable silicone-based coating composition curable to a flexible coating at a coat weight of up to 15 g/m$^2$ when cured comprising:

A. an organopolysiloxane polymer having a siloxane backbone of degree of polymerization no more than 150 end-blocked with at least two silicon-bonded groups R, wherein R denotes an olefinically unsaturated hydrocarbon substituent, an alkoxy group or a hydroxyl group;

B. a cross-linking organosilicon material having at least 3 silicon-bonded reactive groups;

C. a catalyst capable of promoting the reaction between the silicon-bonded groups R of compound A and the silicon-bonded reactive group of compound B;

D. optionally a non-reinforcing filler; and

E. optionally up to a maximum of 3% by weight of a reinforcing filler; wherein organopolysiloxane (A) is a polymer containing vinylmethylsiloxane units in which 10 to 50 mole % of the siloxane units are vinylmethylsiloxane units.

2. A curable coating composition according to claim 1 wherein organosilicon material (B) has the general formulae (VIII) or (IX):

(VIII)

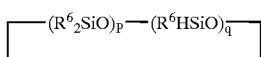

(IX)

wherein R$^6$ denotes an alkyl or aryl group having up to 10 carbon atoms, R$^7$ is a group R$^6$ or a hydrogen atom, p has a value of from 0 to 20, q has a value of from 1 to 70, and there are at least 3 silicon-bonded hydrogen atoms present per molecule.

3. A method of coating a textile fabric with an elastomer-forming composition characterised in that a curable coating composition according to claim 1 is applied to the elastomer-coated fabric at a thickness of 1 to 25 g/m², and is cured to a flexible coating.

4. An elastomer-coated textile fabric characterised in that the elastomer coating is overcoated with a 1 to 25 g/m² flexible coating that is the cured product of a coating composition according to claim 1.

5. An inflatable safety restraint device selected from the group consisting of airbags, inflatable safety curtains, balloons and chutes, comprising a coated textile fabric according to claim 4.

6. A curable silicone-based coating composition curable to a flexible coating at a coat weight of up to 15 g/m² when cured comprising:

A. an organopolysiloxane polymer having a siloxane backbone of degree of polymerization no more than 150 end-blocked with at least two silicon-bonded groups R, wherein R denotes an olefinically unsaturated hydrocarbon substituent, an alkoxy group or a hydroxyl group;

B. a cross-linking organosilicon material having at least 3 silicon-bonded reactive groups;

C. a catalyst capable of promoting the reaction between the silicon-bonded groups R of compound A and the silicon-bonded reactive group of compound B;

D. optionally a non-reinforcing filler; and

E. optionally up to a maximum of 3% by weight of a reinforcing filler; wherein organopolysiloxane (A) is a polysiloxane containing both silicon-bonded vinyl groups and silicon-bonded hydroxyl groups.

7. A method of coating a textile fabric with an elastomer-forming composition characterised in that a curable coating composition according to claim 6 is applied to the elastomer-coated fabric at a thickness of 1 to 25 g/m², and is cured to a flexible coating.

8. An elastomer-coated textile fabric characterised in that the elastomer coating is overcoated with a 1 to 25 g/m² flexible coating that is the cured product of a coating composition according to claim 6.

9. An inflatable safety restraint device selected from the group consisting of airbags, inflatable safety curtains, balloons and chutes, comprising a coated textile fabric according to claim 8.

10. A curable silicone-based coating composition curable to a flexible coating at a coat weight of up to 15 g/m² when cured comprising:

A. an organopolysiloxane polymer having a siloxane backbone of degree of polymerization no more than 150 end-blocked with at least two silicon-bonded groups R, wherein R denotes an olefinically unsaturated hydrocarbon substituent, an alkoxy group or a hydroxyl group;

B. a cross-linking organosilicon material having at least 3 silicon-bonded reactive groups;

C. a catalyst capable of promoting the reaction between the silicon-bonded groups R of compound A and the silicon-bonded reactive group of compound B;

D. a non-reinforcing filler; and

E. optionally up to a maximum of 3% by weight of a reinforcing filler; wherein the coating composition contains 50 to 150% by weight based on organopolysiloxane (A) of a laminar filler (D) having a Mohs value of no more than 5.

11. A method of coating a textile fabric with an elastomer-forming composition characterised in that a curable coating composition according to claim 10 is applied to the elastomer-coated fabric at a thickness of 1 to 25 g/m², and is cured to a flexible coating.

12. An elastomer-coated textile fabric characterised in that the elastomer coating is overcoated with a 1 to 25 g/m² flexible coating that is the cured product of a coating composition according to claim 10.

13. An inflatable safety restraint device selected from the group consisting of airbags, inflatable safety curtains, balloons and chutes, comprising a coated textile fabric according to claim 12.

\* \* \* \* \*